United States Patent Office 2,998,297
Patented Aug. 29, 1961

2,998,297
PHOSPHONITRILIC CHLORIDE POLYMER MANUFACTURE
Lawrence V. Gregor, Spangler, Pa., and John A. Parkins, Woodbury, N.J., assignors to E. I. du Pont de Nemours and Company, Wilmington, Del., a corporation of Delaware
No Drawing. Filed Sept. 24, 1959, Ser. No. 841,962
3 Claims. (Cl. 23—14)

The present invention relates to the production of phosphonitrilic chloride polymers. More particularly, the present invention relates to a procedure to provide improved yields of the polymeric forms liquid at 20° C.

Several methods are known for the preparation of phosphonitrilic chloride ($PNCl_2$). A convenient method is that taught by Schenck and Römer (Ber. 57B, 1343 (1924)), in which phosphorus pentachloride is caused to react with ammonium chloride in the presence of sym-tetrachloroethane as an inert solvent. However, regardless of the method of preparation employed, the compound is obtained as a mixture of polymers having various degrees of polymerization. The lower polymers, i.e., the trimer and tetramer, are crystalline materials having definite melting points. These lower polymers are believed to be cyclic structures whereas the higher members are believed to be chain-like. As is reported in the literature, there is a distinct change in physical properties in going from the tetramer to the pentamer. The trimer and tetramer exhibit marked differences in solubility and also are less easily polymerized further than are the higher polymers. In a mixture of polymeric phosphonitrilic chlorides prepared by the Schenck and Römer method, the crystalline trimer and tetramer comprise approximately 75% of the mixture, the remaining material being primarily oils and consisting of the polymers having a degree of polymerization ranging from 5 to about 15. Much of the prior art has dealt only with the lower polymers because of the ease of separation and the large workable quantities available. These lower crystalline polymers have found particular use as additives to gasoline to control surface ignition and as additives to lubricating oils, in which the compound is quite soluble, to reduce wear at rubbing surfaces.

Unfortunately, no commercially feasible process is now known in the prior art in which the polymers having a degree of polymerization between about 5 and about 15 may be obtained in yields greater than about 25 to 30%. Moreover, the processes known require the use of relatively high temperatures and, in some cases, extreme pressures. Because mixtures of these polymers having an average degree of polymerization of 7 are liquid over a wide temperature range, i.e., 0° C. to 190° C., they are useful not only as additives, but as lubricants by themselves, and as working fluids in applications requiring liquids having a wide range between the freezing and boiling point. Accordingly, a need exists for a relatively simple process for the preparation of these oily polymer mixtures in substantially greater yields.

An object of the present invention, therefore, is an improved process for obtaining polymeric phosphonitrilic chloride having a degree of polymerization from 5 to about 15 in high yield. A further object is a simple and economical process for converting phosphonitrilic chloride having a degree of polymerization of 3 or 4 to the chloride having a degree of polymerization between 5 and 15. Other objects will become apparent as the invention is further described.

We have found that the foregoing objects may be attained when we mix with chlorine in a hot aqueous medium a high polymerized rubbery product obtained by heating at a temperature of at least 250° C. and less than 350° C. phosphonitrilic chloride having a degree of polymerization of 3 or 4. Heretofore, all experimenters have made deliberate efforts to avoid the presence of water in depolymerization reactions because it is well-known in the art that the phosphonitrilic chloride polymers behave as acid chlorides and readily undergo hydrolysis to the phosphonitrilic acids. We have found, surprisingly, that when the highly polymerized rubbery product is refluxed in water in the presence of free chlorine, depolymerization occurs under relatively mild conditions to the phosphonitrilic chlorides having a degree of polymerization between about 5 and about 15. Only relatively slight quantities of the hydrolysis products are obtained.

In accordance with the present invention, substantially high yields of polymeric phosphonitrilic chloride having an average degree of polymerization of about 7 are obtained by heating phosphonitrilic chloride in the form of polymer having a degree of polymerization less than 5 to a temperature of at least 250° C. and less than 350° C. until a highly polymerized rubbery product is obtained, heating the highly polymerized rubber product in an aqueous medium containing free chlorine, and separating the liquid phosphonitrilic chloride having an average degree of polymerization of about 7 thus formed from the aqueous medium.

The polymerization procedure, as exemplified, is well-known in the art, and is a part of this invention only in conjunction with the depolymerization procedure. To obtain the rubbery product, crystalline phosphonitrilic chloride in the form of polymer having a degree of polymerization less than five is heated in air to a temperature of at least 250° C. until the rubbery product is formed. Below a temperature of 250° C., polymerization does not occur. The upper limit for heating the crystalline material is about 350° C. since thermal depolymerization occurs at or above this temperature.

The following example illustrates the process of the invention. However, the example is intended to be illustrative only and is not to be construed as limiting the invention in any manner. The parts in the example are parts by weight.

One hundred parts of a crude mixture of phosphonitrilic chloride polymers was prepared according to the procedure of Schenck and Römer (Ber. 57B, 1343 (1924)), in which 200 parts of phosphorus pentachloride was allowed to react with 65 parts of ammonium chloride at 146° C. for 22 hours in the presence of sym-tetrachloroethane as solvent. The crude mixture was filtered to give 34 parts of liquid phosphonitrilic chloride as a polymer having a molecular weight of about 879 (this corresponds to an average degree of polymerization of slightly over 7) and 66 parts of phosphonitrilic chloride as polymer having a degree of polymerization of 3 or 4. The conditions under which the reaction was effected gave a greater proportion of liquid phosphonitrilic chloride than reported by Schenck and Römer. The 66 parts of solid was deliberately polymerized by heating in air at 260° C. until 66 parts of highly polymerized rubbery product was obtained. The rubbery product then was partially depolymerized by refluxing for 35 minutes in water through which chlorine was bubbled continuously. The reflux temperature of the mixture rose from 100° C. to about 104° C. as the depolymerization progressed. The depolymerization product was extracted with 200 parts of carbon tetrachloride to give a solution containing 35 parts of a mixture of phosphonitrilic chloride polymers having degrees of polymerization between about 3 and about 15. About 13 parts of a highly polymeric residue remained in the aqueous phase. The highly polymeric residue was recycled to the depolymerization apparatus for a subsequent treatment with water saturated with chlorine. The carbon tetrachloride was removed from the solution by vacuum distillation, and the liquid fraction (13 parts) of phosphonitrilic chloride polymer having an average degree of polymerization of about 7 was separated from the crystalline polymer having a degree of polymerization of 3 or 4 (22 parts). This crystalline fraction was recycled, along with fresh crystalline phosphonitrilic chloride having a degree of polymerization of 3 or 4 to the polymerization apparatus. The amount of liquid phosphonitrilic chloride polymer thus was raised from 34 parts to 47 parts, and, as is apparent, the remaining material is available for conversion to liquid polymer by recycling in subsequent runs.

If desired, the solid products remaining from the polymerization and depolymerization steps may be each separately worked up, rather than recycled to the appropriate apparatus, but this obviously provides no economic advantages.

Critical in the depolymerization procedure is the use of water and chlorine. When no chlorine is present, the highly polymerized rubbery product hydrolyzes to phosphonitrilic acids.

By maintaining chlorine present in the water, a sufficient quantity of chlorine is assured. The amount of chlorine is not critical, and can be provided by simply passing chloride gas through the aqueous medium. For example, when chlorine was bubbled through the medium at the lowest rate, i.e., 0.2 mole of chlorine for each mole of rubbery polymer and at a higher rate, i.e., 0.8 mole of chlorine per mole of rubbery polymer, essentially the same amount of liquid polymer was recovered in each case. By conducting the depolymerization of the rubbery product in the presence of water and chlorine, the yields of liquid phosphonitrilic chloride are higher than those obtainable by conventional thermal depolymerization which requires no medium. In addition, the liquid polymer obtained by the depolymerization in water and chlorine has a higher average molecular weight (approximately 850), i.e., an average degree of polymerization of slightly over 7, whereas the liquid polymer obtainable by the conventional thermal depolymerization has a molecular weight in the range of only 650, i.e., an average degree of polymerization of about 5.6. The liquid polymer having the higher molecular weight is much preferred over the liquid polymer having the lower molecular weight because the higher-molecular-weight polymer is liquid over a wider temperature range. Another advantage of the instant invention over the thermal depolymerization method is that lower temperatures are employed. For example, in the conventional thermal depolymerization procedure, the rubbery product is heated to a temperature of at least 350° C., and usually to a temperature of 500° C. whereas, in the instant invention, the temperature employed is only between about 90° C. and the reflux temperature of the aqueous mixture.

The temperature at which the depolymerization is effected is critical. When 100 parts of a highly polymerized rubbery product was heated to only 80° C. for one hour in water and chlorine, little or no reaction took place. When the same amount of the highly polymerized rubbery product was heated to 90° C. for one hour in water and chlorine, 8.5 parts of liquid phosphonitrilic chloride having an average degree of polymerization of 7 was obtained. Thus, the temperature at which depolymerization is effected may range from about 90° C. to the reflux temperature of the mixture, the preferred temperature being the reflux temperature of the mixture. However, higher temperatures may be employed in combination with superatmospheric pressures. The reaction time is shortened somewhat by the use of higher temperatures and pressures but this shortened reaction time is offset by the resultant increase in cost of pressure equipment.

The reaction time for the depolymerization is not critical. Essentially the same results are obtained whether the reaction time is 10 minutes or 70 minutes. For example, when 100 parts of a highly polymerized rubbery product was heated at 100° C. for a period of 10 minutes in water and chlorine, 19 parts (based on the rubbery product) of liquid phosphonitrilic chloride having an average degree of polymerization of 7 was obtained. When 100 parts of the highly polymerized product was heated at 100° C. for a period of 70 minutes in water and chlorine, 16.5 parts of liquid phosphonitrilic chloride having an average degree of polymerization of 7 was obtained. Hence, the reaction time may range from as little as 10 minutes to about 70 minutes. The preferred reaction time is between about 15 and about 35 minutes.

Carbon tetrachloride is the preferred water-immiscible organic solvent for extracting the mixture of phosphonitrilic chloride polymers having a degree of polymerization between about 3 and about 15 from the highly polymeric residue. However, other water-immiscible solvents which are equally suitable for the extraction are the lower halogenated hydrocarbons, such as chloroform or sym-tetrachloroethane, ether, benzene, toluene, and xylenes. The extract may be separated from the residue by any conventional means, for example, decantation, centrifuging, etc. Also, the organic solvent may be removed from the extract by conventional means, for example, vacuum distillation. The liquid polymeric phosphonitrilic chloride, after removal of the organic solvent, may be separated from the crystalline phosphonitrilic chloride polymer by filtration or by any other conventional means.

The present invention has been described in detail in the foregoing. However, it will be apparent that many variations may be introduced without departure from the scope of the invention. We intend, therefore, to be limited only by the following claims.

We claim:

1. An improved process for the manufacture of phosphonitrilic chloride as a polymer having an average degree of polymerization of about 7 which comprises heating phosphonitrilic chloride in the form of polymer having a degree of polymerization less than five to a temperature between about 250 and 350° C. until a highly polymerized rubbery product is obtained, heating the said rubbery product in an aqueous medium in the presence of chlorine at a temperature of from 90° C. to the reflux temperature of the mixture thus formed, and separating the liquid phosphonitrilic chloride having an average degree of polymerization of about 7 thus formed from the said aqueous medium.

2. A process for the manufacture of phosphonitrilic chloride as a polymer having an average degree of polymerization of about 7 which comprises heating phosphonitrilic chloride in the form of polymer having a degree of polymerization less than five to a temperature between about 250 and about 350° C. until a highly polymerized rubbery product is obtained, heating the said rubbery polymer in water and chlorine at a temperature of from 90° C. to the reflux temperature of the mixture thus formed until a partially liquid product is obtained, extracting the phosphonitrilic chloride as polymer having a degree of polymerization between 3 and 15 with a water-immiscible organic solvent selected from the group consisting of lower halogenated hydrocarbons, ether, benzene, toluene, and xylenes, separating the extract from the residue, recycling the said residue for subsequent treatment with water and chlorine, removing the said organic solvent from the extract, separating the liquid phosphonitrilic chloride as polymer having an average degree of polymerization of about 7 from the crystalline phosphonitrilic chloride as polymer having a degree of polymerization less than five, and recycling the said crystalline phosphonitrilic chloride with fresh polymeric phosphonitrilic chloride having a degree of polymerization less than 5 for subsequent polymerization by heating.

3. A process as claimed in claim 2 wherein the water-immiscible organic solvent is carbon tetrachloride.

References Cited in the file of this patent

UNITED STATES PATENTS 2,788,286     Teja et al. _____ Apr. 9, 1957

OTHER REFERENCES

Yost et al.: Systematic Organic Chemistry, Prentice-Hall, 1944, pages 108–111.